Oct. 15, 1968     T. E. GERHARDI     3,405,688

LIVESTOCK PROTECTOR AND ANIMAL REPELLER

Filed Aug. 30, 1966     2 Sheets-Sheet 1

INVENTOR
T. EDWARD GERHARDI
BY
Featherstonhaugh & Co.
ATTORNEYS

Oct. 15, 1968     T. E. GERHARDI     3,405,688
LIVESTOCK PROTECTOR AND ANIMAL REPELLER
Filed Aug. 30, 1966     2 Sheets-Sheet 2

INVENTOR
T. EDWARD GERHARDI
BY
Fetherstonhaugh & Co.
ATTORNEYS

United States Patent Office 3,405,688
Patented Oct. 15, 1968

3,405,688
LIVESTOCK PROTECTOR AND
ANIMAL REPELLER
Thomas Edward Gerhardi, P.O. Box 17, Fort Fraser,
British Columbia, Canada
Filed Aug. 30, 1966, Ser. No. 576,114
9 Claims. (Cl. 119—156)

This invention relates to a protector for livestock, such as sheep, cattle and poultry, which are liable to attack by predatory animals.

It is practically impossible to protect livestock on the range from predatory animals, such as wolves, coyotes, and the like. Even in enclosed areas, livestock are subject to attack by these predatory animals.

The livestock protector according to the present invention includes a hollow base member having a base surface, and a cover fitting over and closing the base member, said member and cover forming a receptacle which, when the protector is in operation, hold an odoriferous material that repels predatory animals. Any suitable odoriferous material may be employed, but it is preferable to use N-hexyl mercaptans or N-amyl mercaptans contained in a suitable base such as paraffin wax. However, materials such as used in moth balls, for example naphthalene, camphor and paradichlorbenzene, have been found useful. The container has one or more openings therein through which fumes from the odoriferous material can escape. A plurality of prongs project outwardly from the base surface of the base member and are adapted to pass through a part of a livestock to be protected. For example, the protectors can be applied to the ears of animals or the wings of poultry. A clamping plate is provided, said plate having holes therein into which the prongs fit after passing through the livestock part, said prongs gripping the plate to retain the latter in position thereon.

The present livestock protector has several advantages, and amongst these are simplicity and cheapness of construction, an important point when it is realized that one rancher may require thousands of them, ease of application to the livestock, small and compact in construction, ease of replacing odoriferous material when necessary, a collapsible construction for shipping and storage, and a construction which greatly reduces the possibility of getting caught in bushes, fences and the like.

Two examples of this invention are illustrated in the accompanying drawings, in which.

Figure 1:
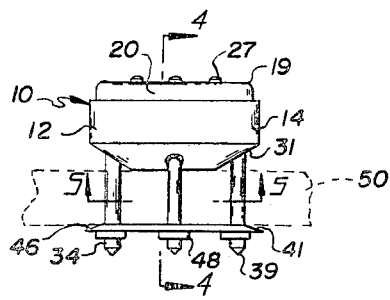
FIGURE 1 is a side elevation of a preferred form of the invention.
Figure 2:
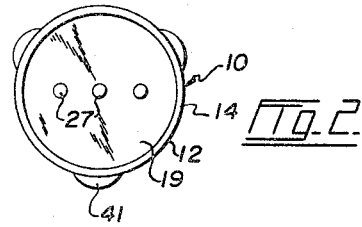
FIGURE 2 is a top plan view of this protector.

Referring to FIGURES 1 to 5 of the drawings, 10 is a livestock protector including a base member 12 having a hollow interior 13 which is defined by an annular wall 14 and a bottom 15. Base member 12 opens out at 17 so as to receive a cover 19 which is cylindrical in shape and has an annular side wall 20 adapted slidably to fit inside wall 14 of base member 12, and an outer wall 21. Cover 19 contains a quantity of an odoriferous material 23, such as described above, which is in solid or semi-solid form. This material is sealed in the cover in any convenient manner, such as by means of a sealing layer 24 of wax or other suitable material. One or more and preferably a plurality of holes 25 are formed in outer wall 21 of cover 19. As the odoriferous material 23 is volatile, it is preferable to keep holes 25 closed until the protector is in operation. For this purpose, each hole 25 has a covering 27 thereover, said covering being on the outer surface of wall 21 of cover 19. When it is desired to uncover holes 25 it is only necessary to scrap off coverings 27.

By providing the odoriferous material in cover 19, it is possible to replace this material without removing protector 10 from the livestock, it being only necessary to remove cover 19 from which the odoriferous material has dissipated, and to replace it with another cover filled with said material.

Bottom 15 of base member 12 has an outer base surface 30. An annular bevel 31 is formed on this base surface around the periphery of member 12, said bevel having a relatively shallow incline so that it extends over a relatively large portion of base surface 30.

A plurality of prongs 34 project outwardly from base surface 30. There are preferably three of these prongs, and they are preferably located in and project outwardly from bevel 31 of said base surface, as clearly shown in FIGURE 5. It will be noted that bevel 31 extends inwardly of prongs 34 so that the central flat surface 35 of base surface 30 does not extend laterally at any point beyond the prongs. This is illustrated by broken lines 37 in FIGURE 5 which extend between the outer surfaces of the prongs, and from this it will be seen that flat surface 35 is within lines 37.

Each prong 34 has a point 39 formed on its outer end. A clamping plate 41 is provided, said clamping plate having a hole 42 therethrough for and positioned to receive each prong 34. Each hole 42 tapers inwardly from an entrance 43 thereof to provide a tight fit around the prongs therein, see FIGURE 4. Clamping plate 41 has an inner surface 45 facing member 12, and this surface is formed with a bevel 46 around the edge thereof. This bevel extends inwardly to the holes 42 and, therefore, to the prongs in said holes.

Figure 3:
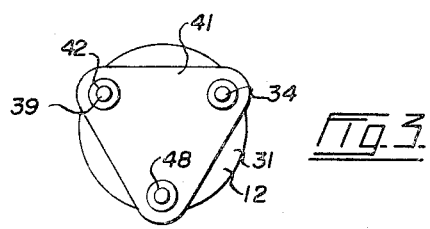
FIGURE 3 is a bottom plan of the protector.
Figure 4:
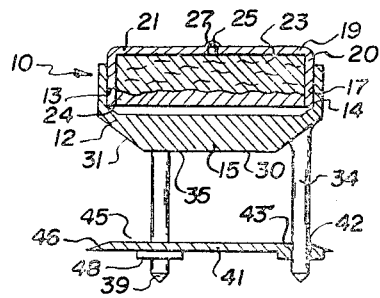
FIGURE 4 is a section taken substantially on the line 4—4 of FIGURE 1.

Although clamping plate 41 may be circular, when there are three prongs, as preferred, this plate is preferably triangular in shape, as clearly shown in FIGURE 3. If desired, the clamping plate may be provided on its outer surface with a boss 48 at and around each hole 42 to strengthen the plate at said each hole.

Figure 5:
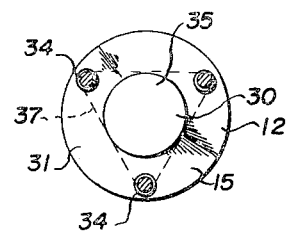
FIGURE 5 is a section taken on line 5—5 of FIGURE 1.
Figure 6:
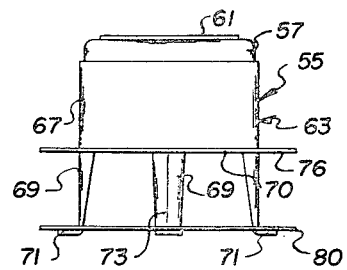
FIGURE 6 is a side elevation of an alternative form of the protector.
Figure 9:
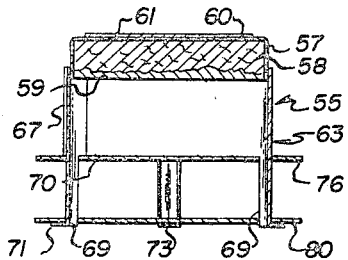
FIGURE 9 is a section taken on the line 9—9 of FIGURE 6.
Figure 7:
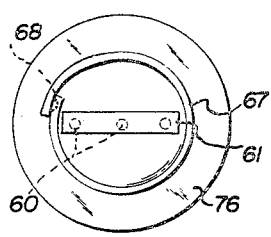
FIGURE 7 is a top plan view of the protector of FIGURE 6.
Figure 8:
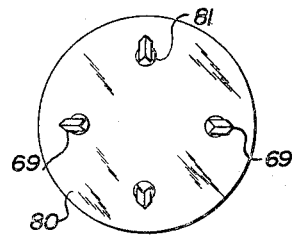
FIGURE 8 is a bottom plan of the protector of FIGURE 6.

When it is desired to use protector 10, cover 19, containing the odoriferous material 23 is inserted in base member 12. Then the prongs 34 are forced through a part of the livestock, such as the ear of an animal or the wing of a fowl, by a special tool, not shown, for this purpose. At the same time, clamping plate 41 is pressed onto the ends of the prongs on the opposite side of the livestock part from that on which member 12 is located. FIGURE 1 illustrates in dotted lines a portion 50 of the ear of an animal. As the base plate holes 42 are tapered inwardly, the clamping plate is forced on to the prongs far enough to stay thereon. Although the protector 10 can be formed of any convenient material, it is preferably formed from a suitable plastic material which can be easily molded and handled. By referring to FIGURE 1, it will be noted that bevel 31 of base memer 12 and bevel 46 of plate 41 are opposed to each other and extend inwardly to prongs 34. With this arrangement, no obstacle, such as a branch of a bush or a wire of a fence can get in between the base member or clamping plate and the animal's ear farther than the prongs. As the obstacle is resting on an inclined surface, the animal can easily pull himself away therefrom. As the flat portion 35 of outer surface 30 of the base member is completely within prongs 34, as shown in FIGURE 5, the obstacle cannot come to rest on any flat surface.

FIGURES 6 to 11 illustrate an alternative protector 55. This has substantially the same elements as protector 10, but it is formed of a bendable material, such as metal, so that it can be stored and shipped in a collapsed state.

Figure 10:
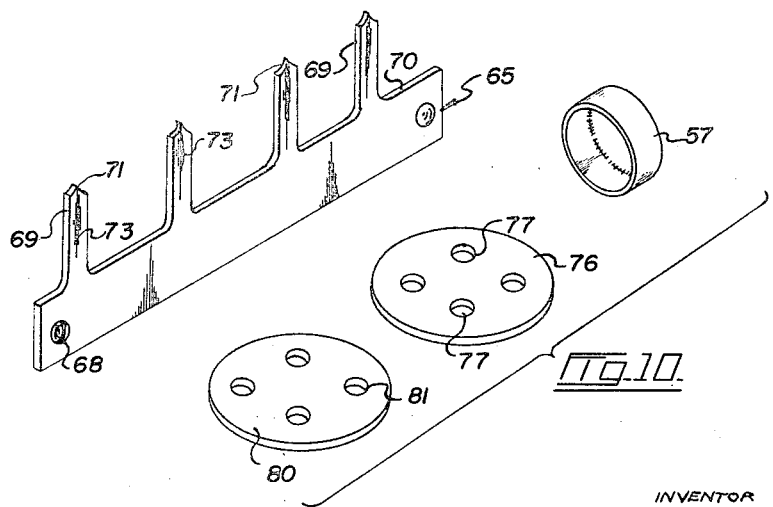
FIGURE 10 is a perspective view of the five parts that make up the protector of FIGURE 6, these parts being laid out in storing and shipping condition.

Protector 55 includes a hollow cover 57 for retaining the odoriferous material 58 sealed in by layer 59, said cover having one or more holes 60 therein covered by a tape 61 when the device is not in use. A hollow base member 63 is formed of a flat strip of bendable material 65 which is stored and shipped in flat condition, as illustrated in FIGURE 10, and when the protector is needed, this strip is bent into a circle to form an annular wall 67, the ends of the strip being held together in any suitable manner, such as by pressing a dimple 68 therein. When wall 67 is formed, cover 57 slidably fits therein. A plurality of prongs 69 project from edge 70 of strip 65, each prong having a pointed outer end 71. These prongs are integrally connected to strip 65, and each one is formed by pressing longitudinally thereof along line 73 to make the prong V-shaped in cross-section. The base for member 63 is formed by a thin bottom plate 76 having a hole 77 therein for and positioned to receive each prong 69. A clamping plate 80 is provided, and has a hole 81 for and positioned to receive each prong 69.

When a protector 55 is required, strip 65 is bent into a circle to form annular wall 67 and the ends of the strip are secured together by a tool for this purpose. Then a cover 57 containing the odoriferous material 58 is inserted into wall 67 which is now hollow base member 63. Then bottom plate 76 is moved along prongs 69 against annular wall 67. After this, prongs 69 are driven through a part of the livestock to be protected and clamping plate 80 is applied thereto. After the prongs have moved into and through holes 81 of the clamping plate the pointed ends of said prongs are bent over to prevent the plate from becoming dislodged.

Protector 55 is not quite as good as protector 10 as far as obstacles such as branches or wires getting in between plates 76 and 80 and the ear or other parts of the livestock are concerned, but it does have the advantage that it can be shipped in collapsed state. FIGURE 10 shows strip 65 with prongs 69 projecting from an end thereof, plates 76 and 80, and cover 57. As cover 57 contains the odoriferous material 58, the cover can be replaced when the material is dissipated. Tape 61 prevents this dissipation from taking place until the protector is secured to a part of the livestock to be protected, at which time tape 61 is removed.

What I claim as my invention is:

1. A livestock protector comprising a hollow base member having a base surface, a cup-like cover for closing said hollow base member, said member and cover forming a receptacle to hold an odoriferous material that repels predatory animals, said receptacle having opening means therein through which fumes from the odoriferous material can escape, a plurality of prongs projecting outwardly from the base surface of the base member and adapted to pass through a part of the livestock to be protected, and a clamping plate formed with holes therein into which said prongs fit after passing through said livestock part, said prongs gripping the plate to retain the latter in position thereon.

2. A livestock protector as claimed in claim 1 in which said cover is hollow with a quantity of the odoriferous material therein and removably fits into the hollow base member.

3. A livestock protector as claimed in claim 1 in which said opening means comprises at least one hole in said cover.

4. A livestock protector as claimed in claim 1 in which said opening means comprises at least one hole in said cover having a removable covering thereover to seal in the odoriferous material, said covering being removed when the protector is in operation.

5. A livestock protector as claimed in claim 1 in which said base surface is bevelled at the periphery thereof around the base member, and said clamping plate is bevelled on the surface thereof facing said base surface and around the periphery of the plate.

6. A livestock protector as claimed in claim 1 in which each of said holes in the clamping plate tapers inwardly away from an entrance thereof facing said base member to provide a tight fit for the prong in said each hole.

7. A livestock protector as claimed in claim 1 in which said hollow base member is formed of a band of bendable material which can be flat for storage and shipping purposes and bent into a circular wall when required, said prongs are connected to an edge of said band, and a bottom for the base member is formed by a base plate having holes therein through which the prongs extend, said base plate being positioned against said edge of the band.

8. A livestock protector as claimed in claim 7 in which each prong is formed of the same material as said band and integrally connected thereto, and each prong being substantially of V-shape in cross-section and tapered at an outer end thereof to a point.

9. A livestock protector as claimed in claim 7 in which each prong extends through the clamping plate and is bent over on the side of said clamping plate remote from the base member.

References Cited
UNITED STATES PATENTS

| | | | |
|---|---|---|---|
| 1,347,868 | 7/1920 | Nichols | 40—301 |
| 1,376,223 | 4/1921 | Pannier | 40—301 |
| 1,390,342 | 9/1921 | Delay | 40—301 |
| 1,780,407 | 11/1930 | Smith | 239—36 |
| 1,780,408 | 11/1930 | Smith | 239—36 |
| 2,138,040 | 11/1938 | Perry | 119—156 |
| 2,349,713 | 5/1944 | Finch | 119—106 |
| 2,539,940 | 1/1951 | Abramson | 224—28 |
| 2,791,202 | 5/1957 | Doyle | 119—106 |
| 2,808,030 | 10/1957 | Costanzo | 119—106 |

ALDRICH F. MEDBERY, *Primary Examiner.*